United States Patent [19]

Crouse et al.

[11] Patent Number: 5,493,651

[45] Date of Patent: Feb. 20, 1996

[54] METHOD AND SYSTEM FOR DEQUEUING CONNECTION REQUESTS IN A SIMPLEX SWITCH

[75] Inventors: Richard S. Crouse, Boca Raton, Fla.; John J. Cazzolla, Cary, N.C.; Luke L. Chang, Boca Raton, Fla.; Marco M. Hurtado, Boca Raton, Fla.; Kha D. Nguyen, Boca Raton, Fla.; Jose L. Rivero, Boca Raton, Fla.; Jose J. Ruiz, Boca Raton, Fla.; Louis Salcedo, Delray Beach, Fla.

[73] Assignee: International Business Machines Corporation, Armonk, N.Y.

[21] Appl. No.: 17,548

[22] Filed: Feb. 16, 1993

[51] Int. Cl.$^6$ .......................... G06F 15/16; G06F 13/14; G06F 9/30; H04Q 11/04

[52] U.S. Cl. .................. 395/200.14; 395/285; 395/872; 364/DIG. 1

[58] Field of Search ...................... 370/58, 67; 395/275, 395/325, 250, 425, 800; 364/229; 341/50

[56] References Cited

U.S. PATENT DOCUMENTS

| | | | |
|---|---|---|---|
| 4,658,250 | 4/1987 | Nering et al. | 340/825.5 |
| 4,783,738 | 11/1988 | Li et al. | 395/800 |
| 4,876,681 | 10/1989 | Hagiwara et al. | 370/60 |
| 4,920,484 | 4/1990 | Ranade | 364/200 |
| 4,962,378 | 10/1990 | Fadem | 340/825.5 |
| 4,968,977 | 11/1990 | Chinnaswamy et al. | 340/825.8 |
| 4,992,933 | 2/1991 | Taylor | 364/200 |
| 5,038,347 | 8/1991 | Courtois | 370/94.1 |
| 5,050,066 | 9/1991 | Myers et al. | 395/575 |
| 5,050,161 | 9/1991 | Golestani | 370/60 |
| 5,214,768 | 3/1993 | Martin et al. | 395/425 |
| 5,261,059 | 11/1993 | Hedberg et al. | 395/325 |
| 5,307,346 | 4/1994 | Fieldhouse | 370/85.1 |
| 5,309,426 | 5/1994 | Crouse et al. | 370/58.1 |
| 5,317,565 | 5/1994 | Crouse et al. | 370/58.2 |

Primary Examiner—Thomas C. Lee
Assistant Examiner—Felicia Ives
Attorney, Agent, or Firm—Bernard D. Bogdon

[57] ABSTRACT

A system and method is provided for dequeuing connection requests in a data communications system comprising a calling subsystem and a called subsystem connected by a serial simplex switch. The connection requests are made by the calling subsystem to the called subsystem by sending a connect request message to the switch and queuing the connect request message in a buffer therein. The switch establishes a connection between the calling subsystem and the called subsystem by thereafter queuing the connect request message in a buffer in the called subsystem. Concurrently, the switch sends a connect request acknowledge message to the calling subsystem while the calling subsystem sends a connect request dequeue message to the switch. To prevent loss of synchronization between the calling subsystem and the switch, the connect request dequeue message received by the switch is interpreted as a disconnect request message and the connect request acknowledge message received by the calling subsystem is interpreted as a connect request dequeue acknowledge message. The connect request dequeue message and the disconnect request message are identically serially encoded, as are the connect request acknowledge message and the connect request dequeue acknowledge message, to enable such interpretation.

18 Claims, 2 Drawing Sheets

METHOD AND SYSTEM FOR DEQUEUING CONNECTION REQUESTS IN A SIMPLEX SWITCH

FIELD OF THE INVENTION

The present invention relates generally to data communications systems comprising subsystems interconnected by a simplex switch, and more particularly to a system and method for dequeuing pending connection requests in such systems which originate from the interconnected subsystems.

BACKGROUND OF THE INVENTION

Data communications systems which include more than one communications subsystem typically utilize a serial crossbar switch to functionally interconnect the subsystems. A serial crossbar switch is a hardware device which permits high-speed serialized data communication between attached subsystems. The switch physically attaches to each subsystem by means of an input/output (I/O) port comprising an individual pair of optical fibers or wires. One of the pair of fibers or wires for each subsystem is used for transmitting information to other systems through the switch, and the other is used for receiving information from other systems via the switch.

The internal switching fabric of the serial crossbar switch provides for connections between any two connected subsystems. The subsystems communicate with each other over these connections, which logically establish communications paths between the transmit wire of a source (or calling) subsystem with a receive wire of a destination (or called) subsystem. In this manner, the switching fabric of the serial crossbar switch provides internal connection crosspoints which eliminate connection blocking. Connections between more than one pair of subsystems may exist concurrently. This concurrency gives the serial crossbar switch a significant performance advantage over single threaded interconnects such as serial ring networks, wherein only one connection between subsystems is permitted at a time.

Conventional serial crossbar switch designs operate on the basis of full duplex connectivity. In a full duplex connection, the switch logically connects the transmit wire of the calling subsystem to the receive wire of the called subsystem, while simultaneously logically connecting the transmit wire of the called subsystem to the receive wire of the calling subsystem. In this manner, each subsystem has a simultaneous communication path to and from the other connected subsystem in which to transfer information. One disadvantage of full duplex connectivity, however, is , that communications between the subsystems is unidirectional along the separate transmit and receive paths. Data is transmitted along the transmit wire of the calling subsystem to the receive wire of the called subsystem, with only an occasional link-level data acknowledgment message sent in return along the transmit wire of the called subsystem to the receive wire of the calling subsystem. This under-utilization of the reverse data path in a full duplex connection results in wasting nearly half of the potential throughput capacity of a serial crossbar switch.

The wasted throughput capacity of a full duplex switch design may be recovered if a switch is instead designed to operate on the basis of simplex connectivity. In a simplex connection, a switch logically connects the transmit wire of the calling subsystem to the receive wire of the called subsystem. However, unlike the full duplex connection, a simplex connection does not provide a separate reverse path for returning messages. Messages addressed to the called subsystem may be received by the called subsystem from other subsystems on its receive link, and messages sent by the calling subsystem may be sent to other subsystems on its transmit link. The transmit link of the called subsystem is available to allow the called subsystem to establish connections with other subsystems, while at the same time, the receive link of the calling subsystem is available to allow connections to the calling subsystem from other subsystems.

The information carried by the transmit and receive links of the subsystems attached to the simplex switch includes data and control messages, which include connect and disconnect requests, connect request acknowledgments, and data acknowledgments. For example, prior to sending data, calling subsystems request connections to (and subsequent disconnections from) other called subsystems via the switch by sending serially encoded connect request and disconnect request link-level control messages to the called subsystems. The called subsystem responds to the calling subsystem request by either acknowledging or not acknowledging the request. In addition, data acknowledgment messages (or error messages) are sent by a called subsystem to a calling subsystem after a data transfer sequence has been completed. Connect and disconnect requests, connect request acknowledgments, and data acknowledgments are sent through the switch in units of control information and data transmission which are referred to as frames.

A simplex switch may also be designed to support the temporary storage (or queuing) of connect requests. That is, when a calling subsystem submits a connect request message frame to the switch, and the switch determines that the called subsystem is presently connected to another subsystem, the switch responds by temporarily storing (queuing) the connect request until the called subsystem becomes available. When the called subsystem is able to accept the queued connect request, the switch makes the connection and sends a connect request acknowledge message to the calling subsystem, which is awaiting acknowledgment of its connect request. Additionally, a simplex switch which supports queuing of connect requests may also be provided with the capability for a calling subsystem to optionally dequeue the queued connect requests by issuing a connect request dequeue message to the switch to cancel the pending queued connect request.

Data communications systems which support queuing and subsequent dequeuing of connect requests through a simplex switch, however, are subject to a potential operational impediment (sometimes referred to as the ships-passing-in-the-night phenomenon). This impediment to system operation may occur if the switch processes a queued connect request by establishing a connection between a called subsystem and a calling subsystem immediately prior to the time at which the calling subsystem issues a connect request dequeue message to the switch. In such a case, while the connect request acknowledge message is being transmitted from the switch to the calling subsystem, the connect request dequeue message is being transmitted from the calling subsystem to the switch. If this happens, the link layer protocol controllers on the switch and the calling subsystem will lose synchronization with each other because they will receive unexpected messages. The controller within the calling subsystem will receive a connect request acknowledge message which is unexpected because the calling subsystem controller has sent a connect request dequeue message and it now expects only the connect request dequeue acknowledge message, and the controller within the switch will receive a connect request dequeue message which is unexpected because the switch controller has already established the connection and thus no connect request is currently queued.

One manner of designing a link layer communications protocol, for a data communications system which supports queuing and subsequent dequeuing of connect requests through a simplex switch, is to treat simultaneously occurring unexpected connect request acknowledge messages and unexpected connect request dequeue messages as errors. The controllers on both the switch and the calling subsystem simply discard the inconsistent message frames, and the calling subsystem thereafter issues a disconnect request message to the switch to break the currently established connection.

The unexpected connect request acknowledge messages and unexpected connect request dequeue messages which are treated as errors, however, corrupt the error statistics of a data communications system. It is an object of the present invention, therefore, to provide a mechanism which is implemented in the link layer protocol controller architecture of such a communications system, which maintains the synchronization of the protocol controllers in the system while eliminating corruption in resulting error statistics.

SUMMARY OF THE INVENTION

The present invention provides a mechanism for maintaining synchronization of protocol controllers in a data communications system which supports connection request queuing and dequeuing. The mechanism resolves operational inconsistencies which may result if a connection is established as a result of a queued connect request immediately prior to the time at which the queued connect request is instructed to be dequeued.

The mechanism is implemented in a data communications system which comprises a plurality of data communications subsystems interconnected by a simplex switch. The switch is provided with input/output (I/O) ports to which the subsystems are attached. Each of the I/O ports in the switch is provided with buffering capability to optionally queue subsystem-to-subsystem connect request messages prior to their processing.

The switch operates in a simplex mode of operation to route data and control messages between interconnected subsystems. The control messages sent between subsystems are link-level control messages and include connect, dequeue and disconnect requests; connect and dequeue request acknowledgments; and data acknowledgments.

Controllers associated with both the calling subsystem and the switch communicate with each other to permit the switch and the calling subsystem to remain in synchronization if the switch processes a queued connect request, by establishing a connection between a called subsystem and a calling subsystem, immediately prior to the time at which the controller for the calling subsystem issues a connect request dequeue message to the switch. Because of the inherent latency in signal processing between the calling subsystem and the switch controllers, the controllers receive messages which are not expected. The design of the controllers, which are implemented as state machines in the switch and the subsystems, prevents the loss of synchronization which would otherwise occur between the respective controllers on the calling subsystem and the switch.

By dynamically redefining the meaning of a connect request dequeue message to be a disconnect request message at the point where the message is interpreted by the switch, and the meaning of a connect request acknowledge message to be a connect request dequeue acknowledge message at the point where the message is interpreted by the calling subsystem, depending on the specific state of the protocol controllers for the switch and the calling subsystem, the architectural inconsistency resulting from the ships-passing-in-the-night phenomenon is eliminated. When it does occur, the calling subsystem interprets the connect request acknowledge message as a connect request dequeue acknowledge message (even though it was originally sent by the switch as a connect request acknowledge). In addition, the switch interprets the connect request dequeue message as a disconnect request (even though it was originally sent by the calling subsystem as a connect request dequeue message). This state-dependent interpretation of received message frames is permitted due to the design wherein connect request dequeue messages and disconnect request messages are identically serially encoded and wherein connect request acknowledge messages and connect request dequeue acknowledge messages are also identically serially encoded. The result is that, regardless of whether or not the ships-passing-in-the-night occurs, the protocol controllers remain synchronized.

DETAILED DESCRIPTION OF THE PREFERRED EMBODIMENT

Figure 1:
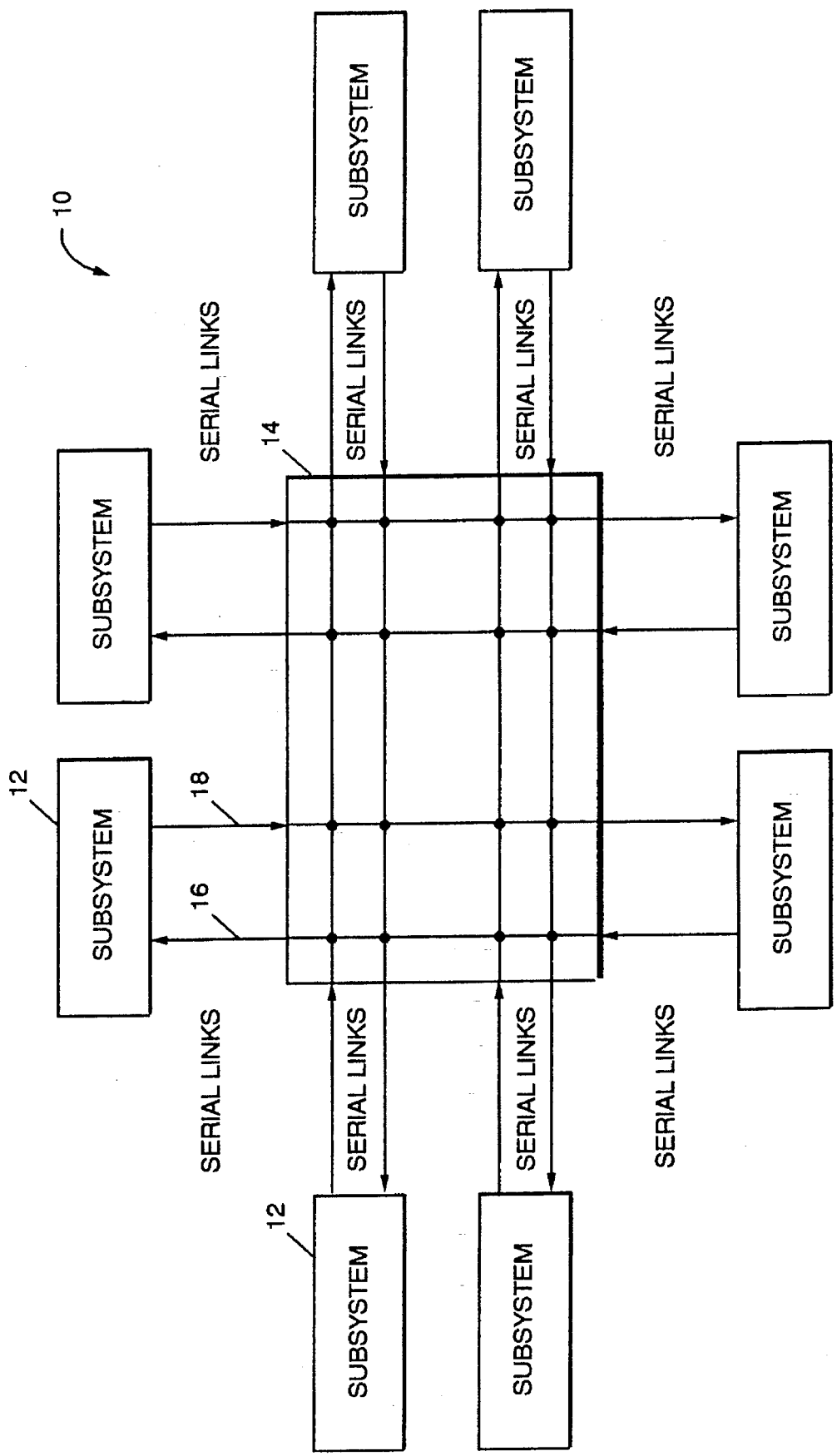
FIG. 1 is a block diagram of a communications system in which is implemented the system for dequeuing connection requests according to the principles of the present invention.

A data communications system 10 constructed according to the principles of the present invention is shown in FIG. 1. The system 10 comprises a plurality of data communications subsystems 12 interconnected by a simplex switch 14. The switch 14 is provided with an internal crosspoint switching fabric, which provides internal connection crosspoints to eliminate connection blocking, and which permits simultaneous connections between more than one pair of subsystems 12.

The switch 14 is connected to the subsystems 12 by means of serial links, which may take the form of optical fibers or pairs of wires. One of the wires or cables is used as an incoming path 16 for reception of frames, which are units of control information and data transmission, from a calling subsystem, and the other is used as an outgoing path 18 for transmission of frames to a called subsystem. Although only eight subsystems are shown, up to sixteen subsystems may be interconnected by a single switch 14.

Figure 2:
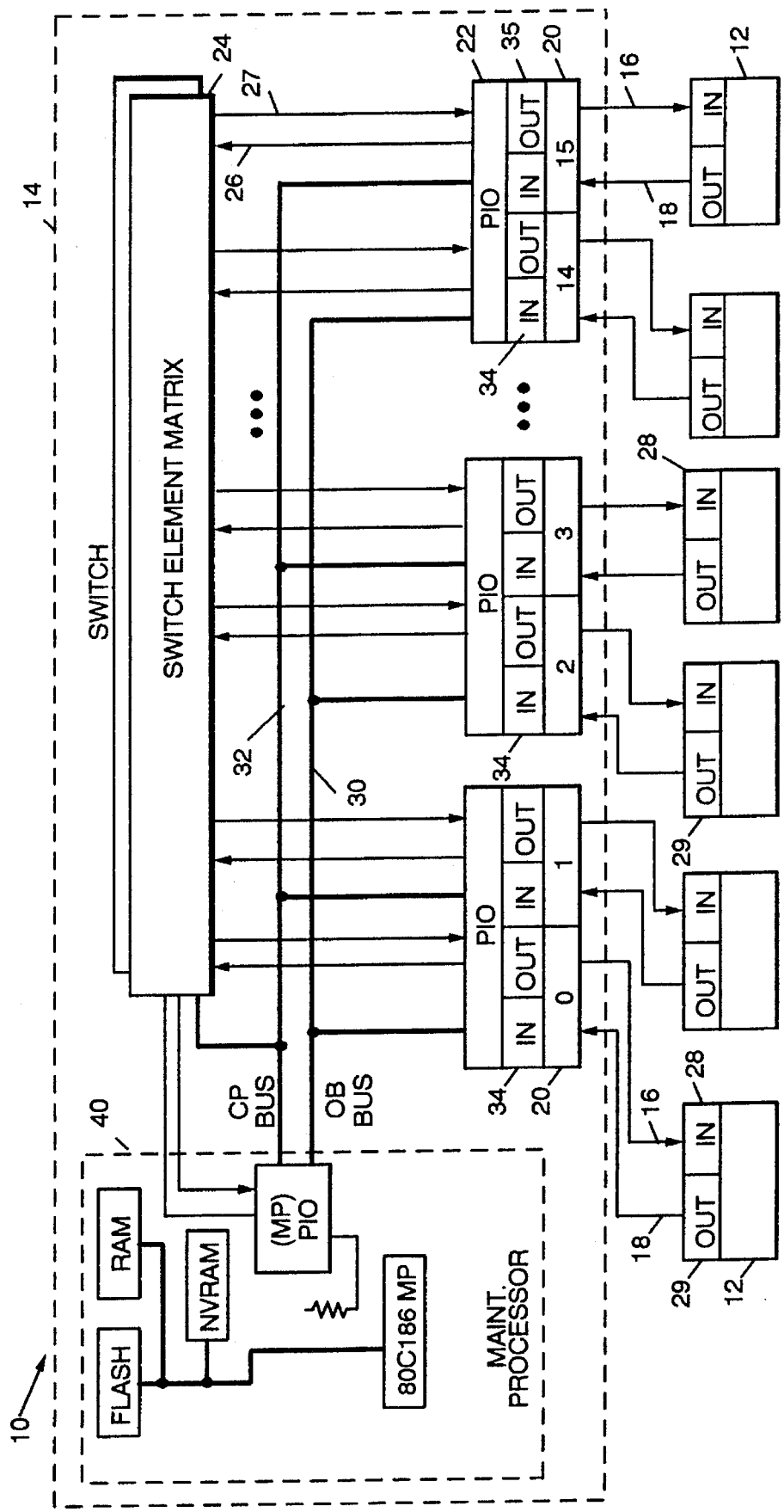
FIG. 2 illustrates in greater detail the internal construction of the system of FIG. 1.

The internal construction of the switch 14 is shown in greater detail in FIG. 2. The switch is provided with sixteen external input/output (I/O) ports 20, indicated as I/O ports 0–15. Subsystems 12 within the system 10 are each attached one of the external I/O ports 20 on the switch 14. The sixteen I/O ports 20 on the switch is provided by eight port input/output (PIO) modules 22, each of which modules provides a pair of I/O ports. The logic for managing data and control message flow at the I/O ports 20 resides within the PIO modules 22 in the form of a protocol controller which is implemented as a state machine in a VLSI circuit.

The simplex switch 14 is provided with a switch element matrix (SEM) matrix 24, which provides the necessary crosspoint switch fabric for the switch. When a subsystem attached to the switch requests a connect or a disconnect to another subsystem in the system, the switch responds by establishing or breaking the appropriate connective path through the SEM matrix 24. The switch also includes a maintenance microprocessor 40 to support logic initialization and maintenance functions and is not involved in the normal subsystem to subsystem processing.

The switch 14 operates in a simplex mode of operation to route data and control messages between interconnected subsystems 12. In this simplex mode of operation, both incoming path 16 and outgoing path 18 for a particular subsystem carry both data and control messages. Data is sent from the subsystem along outgoing path 18 to the PIO module 22 and on to the SEM matrix 24 over dedicated SEM data input bus 26. The switched data is then transferred from the SEM matrix to dedicated SEM data output bus 27 and the appropriate PIO module for subsequent transmission to an appropriate subsystem 12 via an incoming path 16.

The control messages which are sent along these connective paths 16, 18 are link-level control messages and include connect, dequeue and disconnect requests; connect and dequeue request acknowledgments; and data acknowledgments. All data acknowledgments are made over an out-of-band (OB) bus 30, which connects each of the PIO modules 22 on a switch with each other. The called subsystem acknowledges a data transfer from the calling subsystem by sending a data acknowledge message into the switch, without a connection established in this direction to the calling subsystem, where it is routed for transmission to the calling subsystem via the OB bus 30. Because connect request acknowledgment messages and connect request dequeue acknowledgment messages are generated and transmitted directly by the I/O port attached to the called subsystem, these messages need not be routed through the OB bus 30. Disconnect request messages are not acknowledged.

Typically, a called subsystem 12 will acknowledge a data transmission made by a calling subsystem by indicating the acknowledgment to the I/O port 20 to which it is attached by means of a link-level acknowledgment control message. The I/O port 20 to which the called subsystem is attached responds by initiating an operational command cycle to the OB bus 30. The switch responds to the OB command cycle by transferring the acknowledgment control message over the OB bus to the appropriate destination I/O port, and on to the controller for the attached subsystem that originally sent the data being acknowledged.

With respect to connect, dequeue and disconnect requests, all connect request and disconnect requests are made by a particular subsystem over outgoing path 18 via a PIO module 22 to a connection processing (CP) bus 32, which connects each of the PIO modules 22 on a switch with each other and with the SEM matrix 24. The CP bus 32 operates as a circuit switching bus to allow the exclusive use of a connective path between the subsystems until the connection is released. Connect request dequeue messages may or may not be managed by the CP bus 32, depending on operating conditions as described more fully below.

Connect and disconnect request messages enter the subsystems through input ports 28. Connect, dequeue and disconnect request messages exit the subsystems through output ports 29. As with the switch, the logic for managing data and control message flow at the input and output ports 28, 29 for a given subsystem resides within the subsystem in the form of a protocol controller which is implemented as a state machine in a VLSI circuit.

Each of the I/O ports 20 on switch 14 is also provided with an input buffer 34, which is used to store OB message frames prior to their processing over the OB bus 30, and subsystem-to-subsystem connect request messages prior to their processing over the CP bus 32. Control logic within the buffer 34 operates so as to queue OB message frames within the buffer for sequential processing over the OB bus, independently and concurrently with storing a single connect or disconnect message frame for processing over the CP bus 32. After processing over the CP bus, a connect request message may be queued at the called subsystem with other like-addressed connect request messages from other calling subsystems in a buffer 35 of the called subsystem. The system 10 also permits a calling subsystem to optionally cancel a pending queued connect request by issuing a connect request dequeue message to the switch 14.

Typically, a calling subsystem will request a connection to or disconnection from a called subsystem or subsystems by submitting via its protocol controller serially encoded connect request and disconnect request link-level control messages from output port 29, over outgoing path 18, through the switch, and on to the input port 28 of the called subsystem via incoming path 16. The I/O port 20 on the switch 14 to which the requesting subsystem is attached will respond to the connect or disconnect request by generating an operational command cycle to the CP bus 32. In the case of a connect request, the switch responds to the CP command cycle by arbitrating for access to the CP bus prior to queuing the connect request message in the called subsystem buffer to establish the requested connection through the SEM matrix 24.

If the connect request dequeue message is submitted before the switch queues the connect request message in the called subsystem buffer, the connect request dequeue message is not managed by the CP bus 32 but is instead canceled at the calling subsystem by the calling subsystem controller. The calling subsystem exits the state where it is attempting to establish a connection. If a connect request message has been queued by the switch in the called subsystem buffer to establish the requested connection, however, prior to the switch controller receiving the connect request dequeue message from the calling subsystem, the connect request dequeue message is managed by the CP bus 32. In this case, when the called subsystem responds to the queued connect request by generating a CP cycle to establish connection from the calling subsystem identified within the connect request message, the calling subsystem will respond to the CP cycle with an indication that the connection is not wanted and the called subsystem will terminate the connect cycle.

The controllers for both the calling subsystem and the switch communicate with each other to permit the controllers for the switch and the calling subsystem to remain in synchronization if the switch processes a queued connect request by establishing a connection between a called subsystem and a calling subsystem immediately prior to the time at which the controller for the calling subsystem issues a connect request dequeue message to the switch. Because of the inherent latency in signal processing between the controllers, the controllers receive messages which are not within a finite set of expected responses. The design of the controllers, which are implemented as state machines, prevents the loss of synchronization which would otherwise occur between the respective controllers on the calling subsystem and the switch, by conforming to the following set of architectural definitions.

First, a connect request message must be acknowledged by a connect request acknowledge message to confirm establishment of a connection by the switch. Second, a connect request dequeue message must be acknowledged by a connect request dequeue acknowledge message to confirm cancellation of the connect request. Third, connect request dequeue message frames and disconnect request message frames are serially encoded identically at the bit level. Fourth, connect request acknowledge message frames and connect request dequeue acknowledge message frames are also serially encoded identically at the bit level. Lastly, disconnect request messages are not acknowledged.

The link layer protocol controllers in both the calling subsystem and the simplex switch are designed according to the above set of architectural definitions. Specifically, the link layer protocol controller within the switch ports is architected or designed to recognize three states with respect to processing a connect request message: (i) the unconnected state wherein no connection is established and no connect request is queued; (ii) the connect request queued state wherein the switch controller has received a connect request command and queued it for execution, and (iii) the connected state, wherein the switch controller has established the connection and has begun or completed transferring the connect request acknowledge message back to the calling subsystem.

The link layer protocol controller within the calling subsystem is also designed to recognize three states with respect to processing connect request commands: (i) the unconnected state wherein the calling subsystem controller has received a connect request dequeue acknowledge message in response to a previously issued connect request dequeue or the calling subsystem controller has completed transmission of a disconnect request message to the switch; (ii) the connect request queued state, wherein the controller has not received a connect request acknowledge message in response to a previously issued connect request; and (iii) the connected state, wherein the controller has received a connect request acknowledge message in response to a previously issued connect request.

By implementing the above design parameters for the controllers on the switch and the calling subsystem, the operation of the system 10 may proceed as follows. If the switch controller is in the unconnected state, a received connect request dequeue message frame or disconnect request message frame is interpreted as a connect request dequeue command. This interpretation is possible because connect request dequeue message frames and disconnect request message frames are serially encoded identically at the bit level. The switch controller returns a connect request dequeue acknowledge message to the calling subsystem and remains in the unconnected state. Similarly, if the switch controller is in the connect request queued state, a received connect request dequeue message or disconnect request message will also be interpreted as a connect request dequeue message. The switch controller will cancel the queued connect request, return a connect request dequeue acknowledge message to the calling subsystem, and enter the unconnected state.

If the switch controller is in the connected state, however, a received connect request dequeue message or disconnect request message will be interpreted as a disconnect request message. The controller will disconnect the established connection and enter the unconnected state. If the controller has not completed the transmission of the connect request acknowledge message created by the connection establishment, it will do so prior to entering the unconnected state.

The calling subsystem operates as follows. If the calling subsystem controller is in the connected state, and wishes to disconnect, it must send a disconnect request message to the switch, and thereafter the calling subsystem controller enters the unconnected state. If the calling subsystem controller is in the connect request queued state, and has also submitted a connect request dequeue message to the switch controller, the calling subsystem controller remains in the connect request queued state until it receives a connect request dequeue acknowledge message. If the switch has already established the connection with the called subsystem, the connect request acknowledge message received by the calling subsystem will be interpreted as a connect request dequeue acknowledge message. This interpretation is possible because connect request acknowledge message frames and connect request dequeue acknowledge message frames are also serially encoded identically at the bit level. The calling subsystem then enters the unconnected state.

Dynamically redefining the meaning of a connect request dequeue message to be a disconnect request message, and the meaning of a connect request acknowledge message to be a connect request dequeue acknowledge message, depending on the specific state of the protocol controllers for the switch and the calling subsystem, as described, eliminates the architectural inconsistency resulting from the ships-passing-in-the-night phenomenon. When it does occur (i.e., the controller in the switch sends a connect request acknowledge just prior to receiving a connect request dequeue message from the controller in the calling subsystem) the calling subsystem will interpret the connect request acknowledge message as a connect request dequeue acknowledge message (even though it was originally sent by the switch as a connect request acknowledge). In addition, the switch will interpret the connect request dequeue message as a disconnect request (even though it was originally sent by the calling subsystem as a connect request dequeue message). This state-dependent interpretation of received message frames is permitted due to the design wherein connect request dequeue messages and disconnect request messages are identically serially encoded and wherein connect request acknowledge messages and connect request dequeue acknowledge messages are also identically serially encoded. The result is that, regardless of whether or not the ships-passing-in-the-night occurs, the protocol controllers remain synchronized.

Accordingly, the preferred embodiment of a method and, system for dequeuing connection requests in a simplex switch has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. In a data communications system comprising a calling subsystem and a called subsystem connected by a serial simplex switch, a method of dequeuing connection requests which are initiated by the calling subsystem to the called subsystem, said method comprising the steps of:

sending a connect request message to said switch with said calling subsystem and queuing said connect request message in said switch;

establishing a connection between said calling subsystem and said called subsystem through said switch;

concurrently (i) sending a connect request acknowledge message from said switch to said calling subsystem and (ii) sending a connect request dequeue message from calling subsystem to said switch;

interpreting said connect request dequeue message received by said switch as a disconnect request message and proceeding to disconnect the previously established connection; and interpreting said connect request acknowledge message received by said calling subsystem as a connect request dequeue acknowledge message.

2. The method of claim 1, further comprising the steps of (i) identically serially encoding said connect request dequeue message and said disconnect request message to enable said interpretation by said switch and (ii) identically serially encoding said connect request acknowledge message and said connect request dequeue acknowledge message to enable said interpretation by said calling subsystem.

3. The method of claim 2, wherein said called subsystem and said switch are provided with buffers wherein said connect request message is queued.

4. The method of claim 2, wherein said switch is provided with a plurality of I/O ports each of which is adapted to be connected to an attached subsystem.

5. The method of claim 4, wherein said plurality of I/O ports comprises sixteen I/O ports provided by eight port modules each having a pair of I/O ports.

6. The method of claim 4, wherein each of said I/O ports is connected to an internal switching fabric via dedicated data input buses and dedicated data output buses over which is passed, respectively, incoming and outgoing data.

7. The method of claim 3, wherein said connect request messages, said connect request dequeue messages, and said disconnect request messages are managed by a circuit switching bus.

8. The method of claim 7, further comprising the step of arbitrating with said switch for access to said circuit switching bus prior to queuing said connect request message in said called subsystem.

9. A mechanism for dequeuing connection requests in a data communications system comprising a calling subsystem and a called subsystem interconnected by a serial simplex switch, said mechanism comprising:

a calling subsystem controller within said calling subsystem which (i) sends a connect request message to said switch to be queued therein to indicate a request to be connected to said called subsystem, (ii) sends a disconnect request message to said switch to indicate a request to be disconnected from said called subsystem, and (iii) sends a connect request dequeue message to said switch to cancel said queued connect request message;

a switch controller within said switch for (i) receiving said connect request message and establishing a connection between said calling subsystem and said called subsystem through said switch, (ii) receiving said disconnect request message and breaking said connection, and (iii) receiving said connect request dequeue message and dequeuing said queued connect request message;

calling subsystem controller logic within the calling subsystem controller which is responsive to a predetermined set of operating conditions for interpreting said connect request acknowledge message as a connect request dequeue acknowledge message; and switch controller logic within the switch controller which is responsive to said predetermined set of operating conditions for (i) interpreting said connect request dequeue message sent to said switch as said disconnect request message and (ii) disconnecting the previously established connection;

wherein said predetermined set of operating conditions occurs when said switch controller sends said connect request acknowledge message to said calling subsystem controller concurrently while said calling subsystem controller sends said connect request dequeue message to said switch controller.

10. The mechanism of claim 9, wherein said calling subsystem controller logic serially encodes said connect request dequeue message identically as said disconnect request message to enable the interpretation by the switch; and said switch controller logic serially encodes said connect request acknowledge message identically as said connect request dequeue acknowledge message to enable the interpretation by the calling subsystem.

11. The mechanism of claim 10, wherein said switch controller and said calling subsystem controller are implemented in said switch and said calling subsystem, respectively, as state machines which are responsive to said predetermined set of operating conditions.

12. The mechanism of claim 11 wherein said state machines are implemented as hardware in a VLSI circuit.

13. The mechanism of claim 11, wherein said called subsystem controller and said switch controller are provided with buffers wherein said connect request message is queued.

14. The mechanism of claim 13, wherein said switch is provided with a plurality of I/O ports each of which is adapted to be connected to an attached subsystem.

15. The mechanism of claim 14, wherein said plurality of I/O ports comprises sixteen I/O ports provided by eight port modules each having a pair of I/O ports.

16. The mechanism of claim 14, wherein each of said I/O ports is connected to an internal switching fabric via dedicated data input buses and dedicated data output buses over which is passed, respectively, incoming and outgoing data.

17. The mechanism of claim 13, wherein said connect request messages, said connect request dequeue messages, and said disconnect request messages are managed by a circuit switching bus.

18. The mechanism of claim 17, further comprising the step of arbitrating with said switch for access to said circuit switching bus prior to queuing said connect request message in said called subsystem.

* * * * *